G. H. WHEATLEY.
METHOD OF AND APPARATUS FOR MAKING RESILIENT TIRES.
APPLICATION FILED AUG. 29, 1919.
1,405,470.
Patented Feb. 7, 1922.
3 SHEETS—SHEET 1.
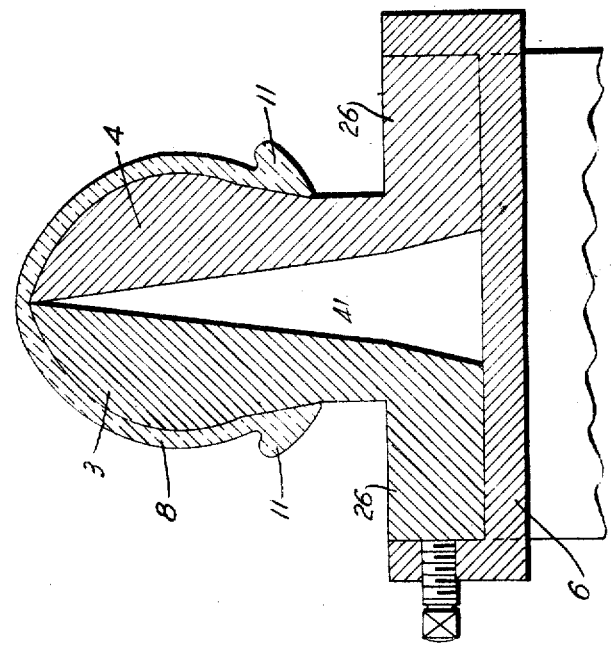
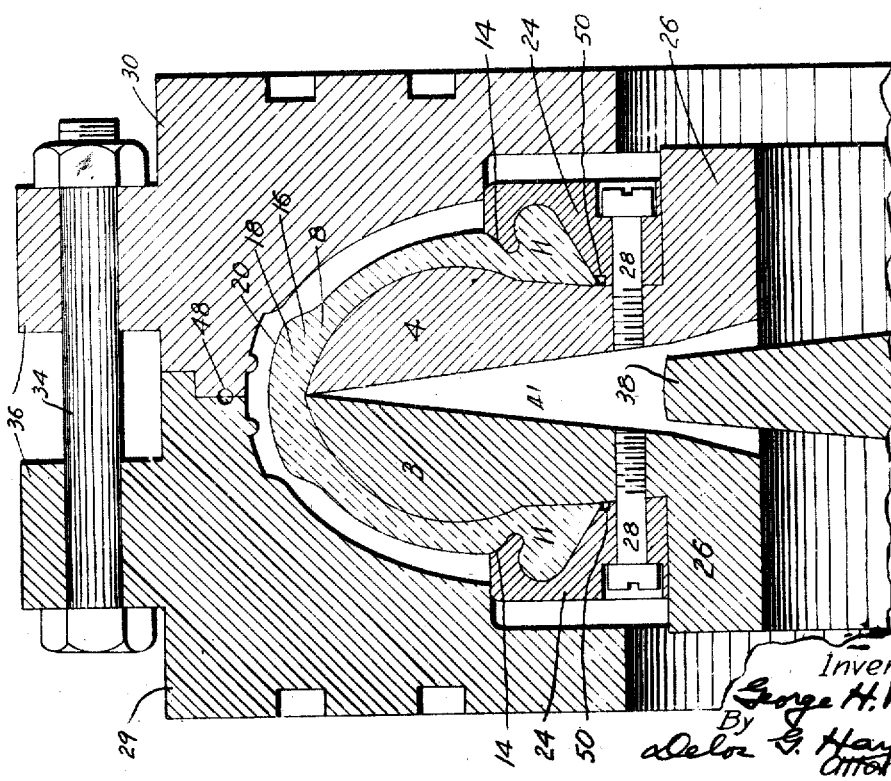
Inventor:
George H. Wheatley.
By Delos G. Haynes,
Attorney.

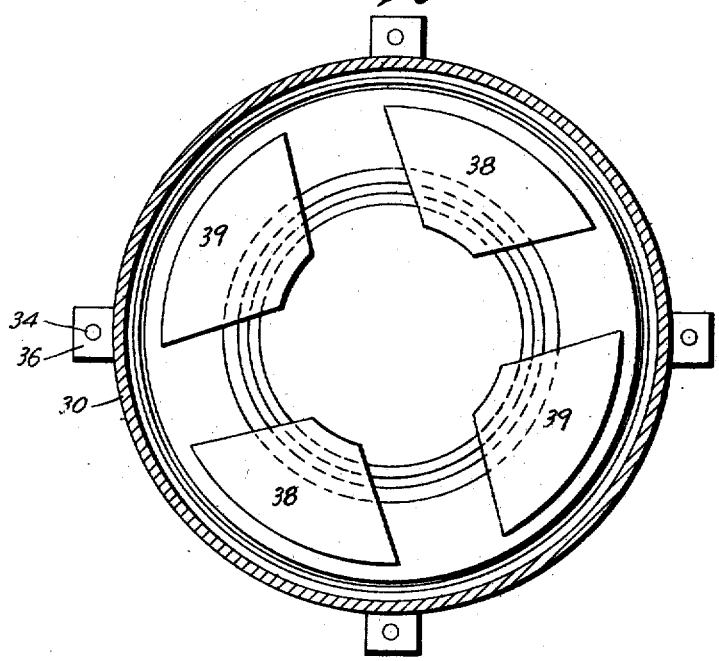
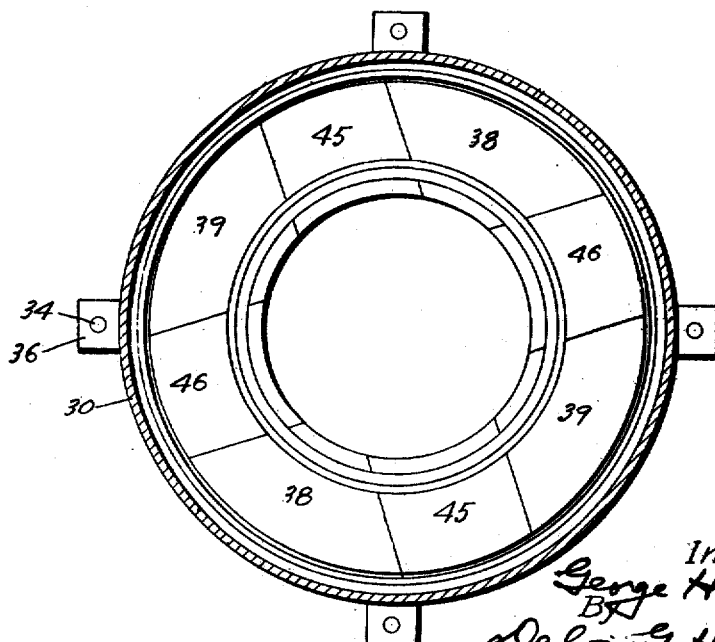

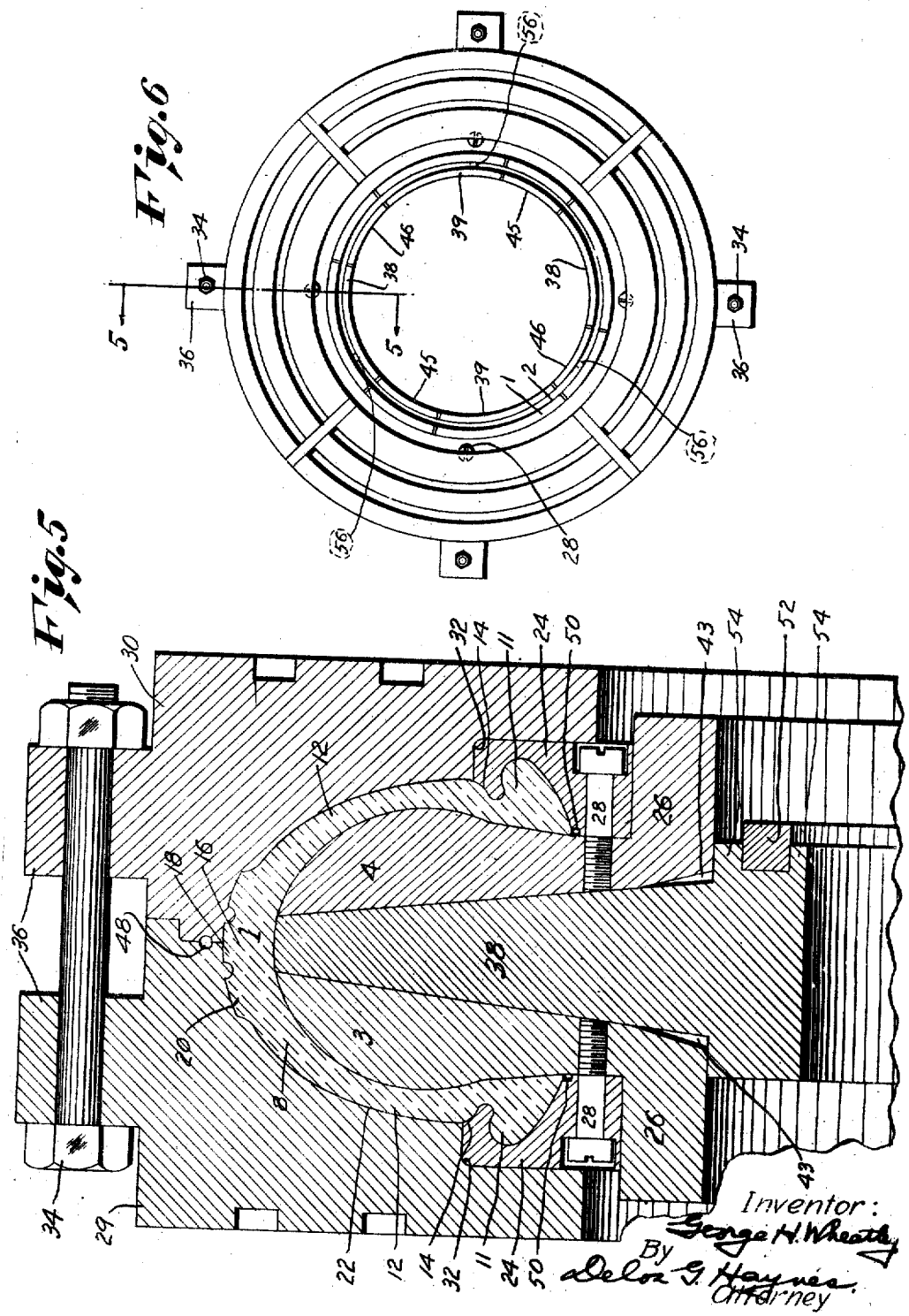

UNITED STATES PATENT OFFICE.

GEORGE H. WHEATLEY, OF MILWAUKEE, WISCONSIN.

METHOD OF AND APPARATUS FOR MAKING RESILIENT TIRES.

1,405,470.  Specification of Letters Patent.  Patented Feb. 7, 1922.

Application filed August 29, 1919. Serial No. 320,697.

*To all whom it may concern:*

Be it known that I, GEORGE H. WHEATLEY, a citizen of the United States, and a resident of Milwaukee, in the county of Milwaukee and State of Wisconsin, have invented an Improvement in Methods of and Apparatus for Making Resilient Tires, of which the following is a specification.

This invention relates to resilient tires, and with regard to certain more specific features, to a tire and method of an apparatus for making the same.

Among the several objects of the invention may be noted the provision of a tire in which the strands, such as cords, are evenly disposed and adequately stretched; the provision of a simple and comparatively inexpensive method of making a tire; and the provision of efficient, reliable and durable apparatus for constructing such an article. Other objects will be in part obvious and in part pointed out hereinafter.

The invention accordingly consists in the elements and combinations of elements, features of construction, steps and sequence of steps, and arrangement of parts which will be exemplified in the structure hereinafter described and the scope of the application of which will be indicated in the following claims. In the accompanying drawings, in which is shown one of various possible embodiments of the invention, Fig. 1 is a transverse section showing the tire partly built up;

Fig. 2 is a similar view of the tire built up and ready for expansion.

Fig. 3 is a longitudinal section showing the tire partly expanded, that is, in a condition subsequent to the one shown in Fig. 2 and prior to the one shown in Figs. 4, 5 and 6;

Fig. 4 is a similar view showing tire expanded, ready for curing.

Fig. 5 is a transverse section on the line 5—5 of Fig. 4;

Fig. 6 is a face view of Fig. 5.

Similar reference characters indicate corresponding parts throughout the several views of the drawings.

Referring now more particularly to Fig. 1 of the drawings, there is illustrated at 1 a tire mounted on the two halves or sections 3, 4 of a core, these halves being held in proper relative position by means of a clamp 6. The tire is shown as partly built up. The first few plies 8 of rubber-impregnated strands have been applied to the core 3, 4, and the extensible beads 11 have been placed in position.

In the next figure, Fig. 2, is shown the tire completely built up. The additional plies 12 of rubber-impregnated strands have been applied, the plies have been trimmed, the chafing-strip 14 if one is used is in position, and the cushion 16, breaker 18, tread 20 and side walls 22 have all been applied to the tire. The strands are preferably cords, though fabric may be used. The bead rings 24 have been placed on the hubs 26 of the core 3, 4 and have been clamped together by screws 28 passing through the bead rings and the core. These screws are preferably tightened after the bead rings have been forced together by suitable means such as temporary clamps, not shown. The two halves 29, 30 of the mold have been placed in position with respect to the tire and core, the bead rings entering the annular recesses 32 in the mold. The mold halves have been clamped together by bolts 34 passing through integral lugs on the mold halves 29, 30. And the clamp 6, which was shown in Fig. 1 as holding the core sections together, has been removed.

The expanding operation is effected by means of two pairs of wedges 38, 39, (Figs. 3 and 6). One of the wedges 38 is shown in Fig. 2 as ready to enter the recess 41 between the core halves 3, 4, which are preferably relieved as at 43 to facilitate entrance of the wedges into said recess.

As the wedges approach their final position the rubber fills the cavity of the mold, any excess flowing into the overflow cavity 48. At this time any excess of material in the beads 11 can flow into the recesses formed by the relieving of the bead rings at the points 50, Fig. 5.

This circumferential expansion of the tire may be carried on manually or by suitable mechanism. In the present instances, the parts are shown adapted for manual operation. This comprises simply driving the wedges 38 and then the wedges 39 into the recess 41 as far as they can conveniently be driven, that is, to about the position illustrated in Fig. 4. Then the two pairs 45, 46 of spacers are driven into the portions of the recess 41 not filled by the wedges 38, 39. As the spacers approach their final position as shown in Fig. 6, it becomes easier to drive the wedges 38, 39 home. Thus the wedges and the spacers are all driven into their final positions and the ring 52 is driven into the grooves formed by the ribs 54 in the wedges and spacers, to hold the core in position throughout the curing operation. The tire is now in the condition shown in Figs. 5 and 6, ready for curing.

The expansion effected as above described causes a definite stretch of the cords, expanding the tire to a definite size, and tightening the cords to such an extent as to minimize or eliminate any irregularities in the disposition of the cords either during or after curing, due to flowing of the rubber or to any any other cause. It is practicable, with the power available in the wedges, to stretch the cords to any desired extent without the attendant breakage so prevalent in the use of air bags and other prior devices for stretching these cords. Furthermore, the tolerance in the quantity of rubber is greater with the present invention than with devices of the prior art, since even a comparatively great flowing of rubber during curing, with the present invention, does not disarrange the tightly stretched cords or interfere with the effectiveness of the completed article.

The curing operation is carried on in the usual way, preferably in a closed or French press, the tires being banked in the press in any convenient quantity and arrangement. Owing to the high thermal conductivity of the material inside the tire, that is, the core and wedges, a greater uniformity of curing temperature throughout the tire may be obtained. This lessens the maximum temperature needed as compared with other devices, and reduces both the time of curing and the heat required, as well as minimizing the losses due to imperfect curing.

The tire herein illustrated is of the soft-bead or extensible-bead type, which can be stripped from the core after curing. In adapting this invention to tires of the non-extensible bead type, it is preferable to alter the shape of the bead rings 24 to conform to the contour of the non-extensible bead, and to make the core collapsible, to facilitate separation of core from tire after curing.

The present invention may be used for making wrapped tread tires. In such case the top mold is omitted, the side rings are put on, the tire then wrapped with strips of cloth or tape and then cured in the same general manner as is indicated above.

From the above it is clear that with the apparatus and process of the present invention, a tire of high quality may be made inexpensively, with minimum waste and with apparatus both simple in construction and readily operable by comparatively unskilled labor.

It may be noted that in removing the tire from the mold and core after curing, a tire of the extensible-bead type is simply stripped from the core as noted above, the ring 52 being pushed out of position by rods driven through the apertures 56 in the wedges and spacers.

In view of the above, it will be seen that the several objects of the invention are achieved and other advantageous results attained.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim:

1. The method of making a resilient tire which comprises building up the tire on a core and expanding the core axially of the tire while the tire is confined in a mold.

2. The method of making a resilient tire which comprises building up the tire on a core, holding the tire beads against displacement, fitting a mold around the tire and expanding the core axially of the tire.

3. The method of making a resilient tire which comprises building up the tire on a core, holding the tire beads against displacement, fitting a mold around the tire, wedging the core apart to expand the core axially of the tire, and curing the tire while thus expanded and confined in the mold.

4. The method of making a resilient tire which comprises building up the tire on a core, fitting a mold around the tire, and separating the tire beads while the tire is confined in the mold.

5. The method of making a resilient tire which comprises building up the tire on a core, fitting bead rings in place, confining the tire in a mold and expanding the tire by separating the bead rings axially of the tire while substantially preserving the initial diameters of the respective portions of the tire.

6. Apparatus for making resilient tires, comprising an axially expansible core on which the tire is built up, and a sectional mold adapted to be applied outside the core.

7. Apparatus for making resilient tires, comprising an expansible core on which the tire is bulit up, means for holding the tire beads against displacement, a sectional mold adapted to be applied outside the core, wedges for expanding the core axially of the tire, and spacers adapted to be inserted between adjacent wedges to fit the interstices between adjacent wedges.

8. Apparatus for making resilient tires, comprising an expansible core on which the tire is built up a sectional mold adapted to be applied outside the core, wedges for expanding the core axially of the tire, spacers adapted to be inserted between adjacent wedges to fit the interstices between adjacent wedges, and means for holding the wedges and spacers in place.

9. Apparatus for making resilient tires, comprising a sectional axially expansible core on which the tire is built up, rings adapted to be applied outside the tire beads to hold the beads against displacement, a sectional mold adapted to be applied outside the core and rings, the rings fitting into recesses in the mold to hold the rings against displacement, means for fastening the mold sections together, wedges for expanding the core axially of the tire, wedge-shaped spacers adapted to be inserted between adjacent wedges to fit the interstices between adjacent wedges, and a ring adapted to be inserted in grooves formed on the wedges to hold the wedges and spacers in place.

10. Apparatus for making resilient tires, comprising a sectional axially expansible core on which the tire is built up, rings adapted to be applied outside the tire beads to hold the beads against displacement, a sectional mold adapted to be applied outside the core and rings, the rings fitting into recesses in the mold to hold the rings against displacement, means for fastening the mold sections together, wedges for expanding the core axially of the tire, wedge-shaped spacers adapted to be inserted between adjacent wedges to fit the interstices between adjacent wedges and a ring adapted to be inserted in grooves formed on the wedges to hold the wedges and spacers in place, and means for removing the ring.

11. Apparatus for making resilient tires, comprising annular members having a recess between them and wedges adapted to be forced into said recess to separate the members axially of the tire.

12. Apparatus for making resilient tires, comprising annular members having a wedge-shaped recess between them and adapted to be separated axially of the tire by wedges driven radially outwardly into said recess, and means for holding the members in expanded position.

In testimony whereof, I have signed my name to this specification.

GEORGE H. WHEATLEY.